US005640638A

United States Patent [19]
Omiya

[11] Patent Number: 5,640,638
[45] Date of Patent: Jun. 17, 1997

[54] FILM FEED MECHANISM FOR PHOTOGRAPHIC CAMERA

[75] Inventor: Akio Omiya, Saitama-ken, Japan

[73] Assignee: Fuji Photo Optical Co., Ltd., Saitama-ken, Japan

[21] Appl. No.: 554,242

[22] Filed: Nov. 8, 1995

[30] Foreign Application Priority Data

Nov. 9, 1994 [JP] Japan .................... 6-275137

[51] Int. Cl.$^6$ .................................. G03B 1/00
[52] U.S. Cl. .......................... 396/411; 396/535
[58] Field of Search ............ 354/212; 396/411, 396/413, 418, 535

[56] References Cited

U.S. PATENT DOCUMENTS

| | | | |
|---|---|---|---|
| 5,221,940 | 6/1993 | Daitoku et al. | 354/173.1 |
| 5,337,108 | 8/1994 | Kaihara et al. | 354/218 |
| 5,410,378 | 4/1995 | Tasaka et al. | 354/149.11 |
| 5,515,127 | 5/1996 | Nisioka | 354/212 |
| 5,521,662 | 5/1996 | Suzuki | 354/76 |

FOREIGN PATENT DOCUMENTS 60-21734  2/1985  Japan .

*Primary Examiner*—Safet Metjahic
*Assistant Examiner*—Christopher Mahoney
*Attorney, Agent, or Firm*—Sixbey Friedman Leedom & Ferguson; Gerald J. Ferguson, Jr.; Thomas W. Cole

[57] ABSTRACT

A photographic camera has a magazine chamber in which a film magazine is loaded, a film take-up chamber and a lens barrel unit which supports a taking lens system and is disposed between the magazine chamber and the film take-up chamber. A film feed mechanism includes a film take-up spool which is disposed in the film take-up chamber and is provided therein with a film feed motor, a film rewind spindle disposed in the magazine chamber to be drivingly engaged with the film spool of the film magazine loaded in the magazine chamber and a gear train for transmitting the driving force of the film feed motor to the film rewind spindle. A part of the feed gears in the gear train is supported on a supporting portion formed on a part of a stationary lens barrel of the lens barrel unit.

3 Claims, 2 Drawing Sheets

FILM FEED MECHANISM FOR PHOTOGRAPHIC CAMERA

BACKGROUND OF THE INVENTION

1. Field of the Invention

This invention relates to a film feed mechanism for a photographic camera, and more particularly to a mounting structure for a film feed gear in a film feed mechanism.

2. Description of the Related Art

There has been a demand for miniaturization of a camera as a method of making cameras more prevailing and various type small-sized cameras have been developed and put into practice. In this regard, there has been known a very small camera using special small-sized film. However such a very small camera is disadvantageous in that resolution of images deteriorates as the film size is reduced and a sharp picture cannot be obtained, and that such special small-sized film is not so available and difficult to obtain.

Accordingly, there has been a demand for the camera to be as small as possible while using a common 35 mm film magazine.

Recently, small-sized cameras are generally provided with a film feed mechanism in which film take-up operation and film rewind operation are carried out under the force of a film feed motor in order to simplify the photographing operation.

Further there has been known a structure in which the film feed motor is disposed within a film take-up spool, a film rewind spindle is provided in a film magazine chamber to be engaged with a film spool, around which a roll film is wound, and the driving force of the film feed motor is selectively transmitted to the film take-up spool through a reduction gearing or to the film rewind spindle through the reduction gearing and a gear train.

As the mounting structure for the gears in the gear train for transmitting the driving force of the film feed motor to the rewind spindle, there has been known one in which a support wall is formed on a vertical wall of the camera body, which forms the magazine chamber and the film take-up chamber, to extend parallel to the optical axis of the camera in perpendicular to the vertical wall and boss portions are formed on the support wall and the gears are fitted on the boss portions.

However the mounting structure for the gears is disadvantageous in that a predetermined clearance is required between the support wall and a lens barrel unit so that they don't interfere with each other, which adds to the height of the camera body and obstructs miniaturization of the camera.

More particularly, a viewfinder is provided above the gear train and the lens barrel unit is disposed below the gear train, and accordingly the viewfinder and the lens barrel unit must be at a distance from each other sufficient to dispose the support wall and the gear train without interference therewith, which results in a larger height of the camera body.

SUMMARY OF THE INVENTION

In view of the foregoing observations and description, the primary object of the present invention is to provide a film feed mechanism in which the gear train can be mounted without increasing the height of the camera body.

In a photographic camera having a magazine chamber in which a film magazine is loaded, a film take-up chamber and a lens barrel unit which supports a taking lens system and is disposed between the magazine chamber and the film take-up chamber, the film feed mechanism of the present invention comprises a film take-up spool which is disposed in the film take-up chamber and is provided therein with a film feed motor, a film rewind spindle disposed in the magazine chamber to be drivingly engaged with the film spool of the film magazine loaded in the magazine chamber and a gear train for transmitting the driving force of the film feed motor to the film rewind spindle and is characterized in that a part of the feed gears in the gear train is supported on a supporting portion formed on a part of a stationary lens barrel of the lens barrel unit.

Preferably the supporting portion is in the form of a boss portion projecting upward from the upper surface of the stationary lens barrel and a feed gear which rotates in a plane parallel to the upper surface of the camera body is fitted on the boss portion. The supporting portion may be in the form of a bearing portion which projects upward from the upper surface of the stationary lens barrel and supports a feed gear fixed to an end of a transmission shaft extending parallel to the upper surface of the camera body.

Thus in accordance with the present invention, since a supporting portion is formed on a part of the stationary lens barrel of the lens barrel unit and a part of the feed gears in the gear train, an additional support wall need not be provided on the camera body and accordingly the height of the camera body need not be increased, whereby the camera can be compact in size.

DESCRIPTION OF THE PREFERRED EMBODIMENT

Figure 1:
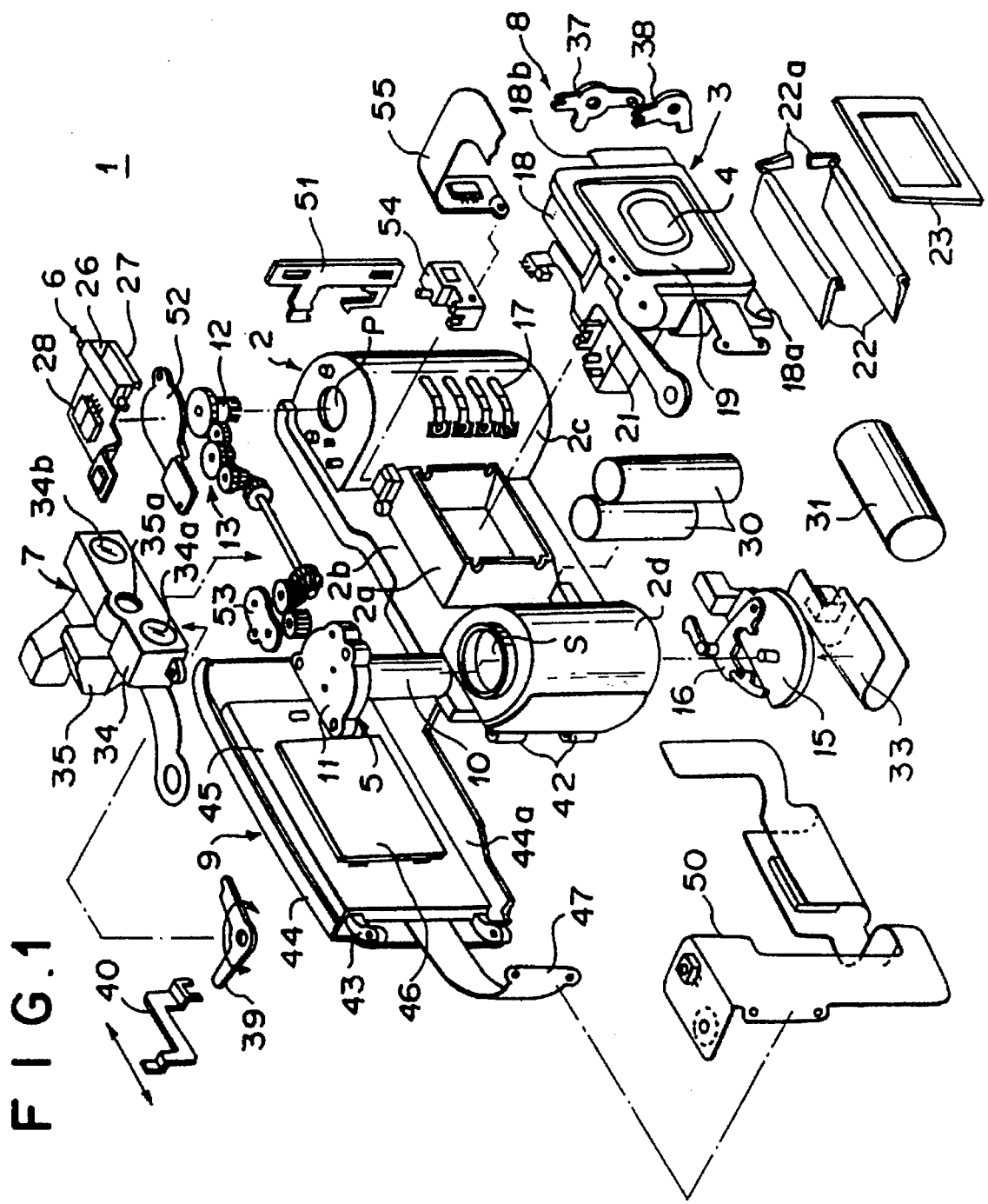
FIG. 1 is an exploded perspective view showing a photographic camera provided with a film feed mechanism in accordance with an embodiment of the present invention, a part of the elements of the camera such as a front cover being removed.
Figure 2:
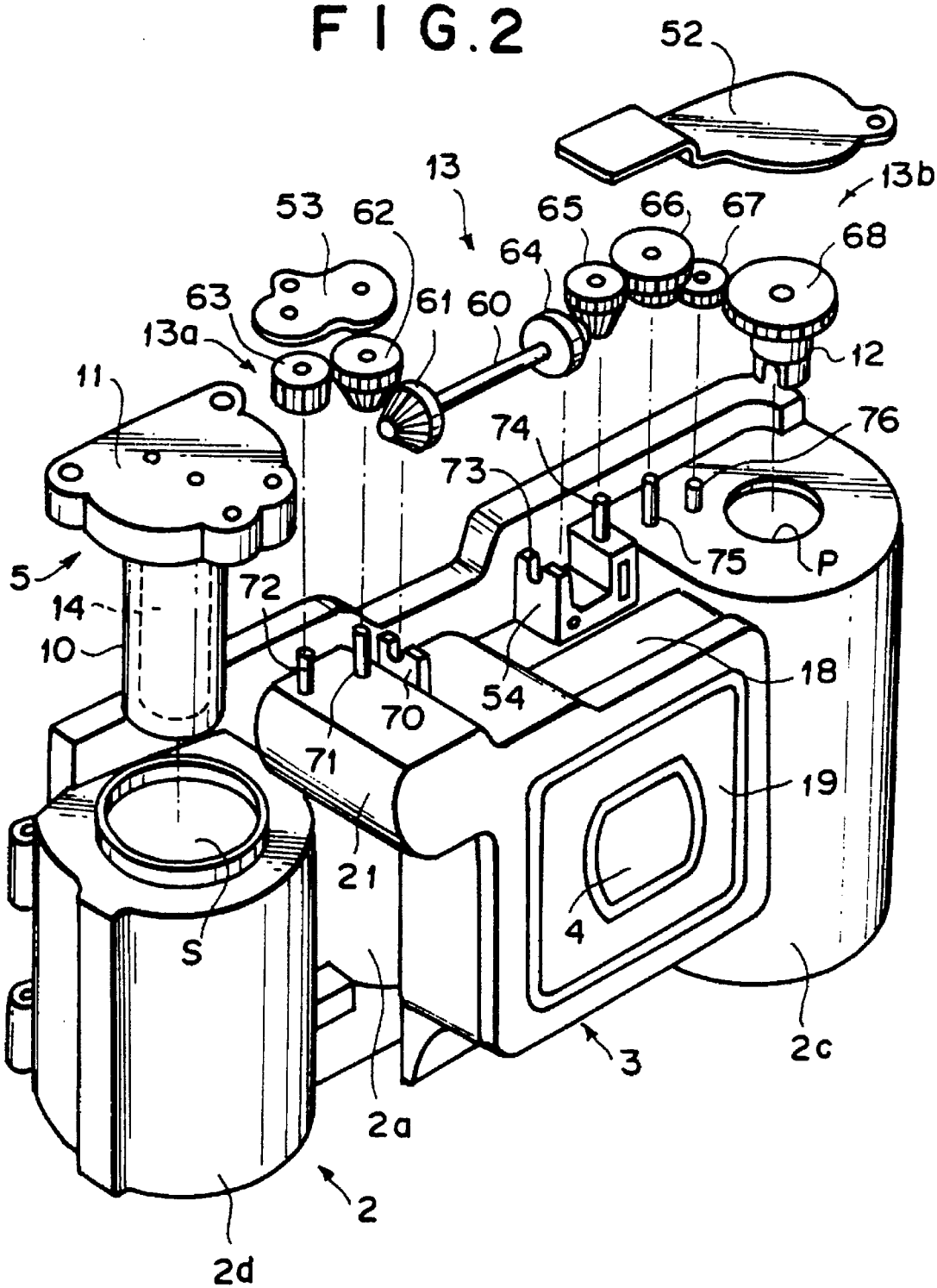
FIG. 2 is an exploded perspective view showing an important part of the film feed mechanism.

In FIGS. 1 and 2, a photographic camera 1 provided with a film feed mechanism in accordance with an embodiment of the present invention has a camera body 2 formed of a plastic material. The camera body 2 is provided with a tubular portion 2a at the center thereof and a lens barrel unit 3 having taking lens system 4 is held by the tubular portion 2a. A flat portion 2b of the camera body 2 defines an aperture. A substantially cylindrical magazine chamber cover 2c is formed on one end portion of the camera body 2 and defines therein a magazine chamber P. A substantially cylindrical take-up chamber cover 2d is formed on the other end portion of the camera body 2 and defines therein a film take-up chamber S.

A known film magazine (not shown) having therein a roll film is loaded in the magazine chamber P defined by the magazine chamber cover 2c, and a film take-up spool 10 of a film feed mechanism 5 is inserted into the take-up chamber S defined by the take-up chamber cover 2d from above. The film take-up spool 10 is provided therein a film feed motor 14 (FIG. 2) and the roll film in the film magazine is taken up around the spool 10. A reduction gearing 11 is provided on the top of the spool 10. A film rewind spindle 12 is inserted into the magazine chamber P from above to be engaged with the film spool of the film magazine loaded in the magazine chamber P. A gear train 13 is provided between the rewind spindle 12 and the reduction gearing 11.

The reduction gearing 11 is formed by packing a plurality of reduction gears into a gear box and rotatably mounting the take-up spool 10 on the underside of the gear box. The reduction gearing 11 is drivingly connected with a gear on the upper end of the spool 10 by way of a planetary gear clutch.

Driving force of the film feed motor 14 in the spool 10 is reduced in speed by the reduction gearing 11 and then selectively transmitted to the take-up spool 10 or the rewind spindle 12. When the driving force of the motor 14 is transmitted to the spool 10, the film in the magazine is taken up around the spool 10 and when the driving force is transmitted to the rewind spindle 12, the film is rewound into the magazine. A claw mechanism 16 is provided on a bottom member 15 which is mounted on the lower end of the take-up chamber cover 2d to define the bottom of the take-up chamber S and is brought into engagement with perforations on the film leader when a film magazine is loaded in the camera to wind the film leader around the spool 10. Detecting contacts 17 for detecting the type of loaded film magazine such as sensitivity of the film are disposed on the outer surface of the magazine chamber cover 2c.

The lens barrel unit 3 comprises a stationary lens barrel 18 which is fixed to the tubular portion 2a of the camera body 2 and a movable lens barrel 19 which supported in the stationary lens barrel 18 to be movable back and forth in the direction of the optical axis. The taking lens system 4 is held in the movable lens barrel 19.

A lens driving mechanism (a lens drive motor) 21 for driving the movable lens barrel 19 is integrally provided on the upper surface of the stationary lens barrel 18 and moves the movable lens barrel 19 along a guide shaft by way of a reduction gearing (not shown). A pair of mask members 22 for changing the image size are pivoted on the tubular portion 2a of the camera body 2 and a light-shielding plate 23 is disposed in front of the mask members 22.

A strobe light 26 of a strobe system 6 is disposed on the front face of the camera body 2 above the magazine chamber cover 2c, and a finger touch sensor 27 is provided with respect to the strobe light 26. A strobe control circuit 28 is disposed in the vicinity of the strobe light 26 and a pair of main capacitors 30 for accumulating electric energy for operating the strobe light are cylindrical in shape and are arranged in a row parallel to the optical axis in a space between the lens barrel unit 3 and the take-up chamber cover 2d.

A power source or cell 31 is accommodated in a cell chamber formed by a wall portion 18a which is formed integrally with the stationary lens barrel 18 in a space below the lens barrel unit 3 and supplies power for various drive means in the camera. A charge control circuit 33 for charging the main capacitors 30 is separated from the strobe control circuit 28 and is disposed in a space below the take-up chamber cover 2d. The finger touch sensor 27 is disposed in the vicinity (underside) of the strobe light 26 and detects that the strobe light 26 is covered with a finger and flash from the strobe light 26 can be interrupted, on the basis of, for instance, change in electrostatic capacity.

A viewfinder unit 7 including an autofocus mechanism 34 and a viewfinder 35 is disposed above the lens barrel unit 3. In the viewfinder unit 7, an objective window 35a of the real image viewfinder 35 is disposed at the center thereof on the front face and a light projecting lens 34a and a light receiving lens 34b of the autofocus mechanism 34 are disposed on opposite sides of the objective window 35a.

Part of an image size switching mechanism 8 for changing the image size between a normal size and a panoramic size is disposed in a space between the lens barrel unit 3 and a magazine chamber cover 2c. That is, upper and lower levers 37 and 38 adapted to be engaged with arms 22a on ends of the respective mask members 22 are pivoted on the side face of the stationary lens barrel 18 of the lens barrel unit 3. An intermediate lever 39 is mounted on the underside of the viewfinder unit 7 to be rotatable in a horizontal plane is connected to a switching member 40 slidably supported on a camera cover (not shown) so that the mask member 22 are rotated, between a panoramic size position where the exposure size is set to the panoramic size and a normal size position where the exposure size is set to the normal size, by way of the intermediate lever 39, the upper and lower levers 37 and 38 and the arms 22a in response to operation of the switching member 40.

A pair of camera back support portions 42 are formed on upper and lower end portions of the take-up chamber cover 2d and hinge members 43 on a camera back 9 are supported on the support portions 42. The camera back 9 comprises a camera back body 44 of metal, a retainer plate 45 for holding electronic circuit parts such as a date module and a rectangular pressure plate 46 which is supported to be slightly movable relative to the retainer plate 45 in the direction of the optical axis and urges the film toward the aperture 2b under the force of a spring.

The camera back body 44 covers the rear side of the camera body 2 and is provided with a bottom portion 44a which covers a part of the bottom side of the camera body 2. When the camera back 9 is opened, the bottom opening of the magazine chamber cover 2c is exposed and the film passage from the magazine chamber P to the take-up chamber S is exposed, whereby the film magazine can be loaded in a so-called "drop-in-load system". The bottom portion 44a has a cutaway portion which gives access to the lid (not shown) of the cell chamber even when the camera back 9 is closed so that the cell 31 in the cell chamber can be changed without opening the camera back 9.

A flexible circuit board 47 for the electronic circuit parts on the camera back 9 is provided on one side of the retainer plate 45 and is connected to a flexible circuit board 50 for a main control circuit on the camera body 2.

A date recording light emitter 54 is provided on the upper surface of the tubular portion 2a of the camera body 2 adjacent to the magazine chamber cover 2c. Reference numeral 55 denotes a circuit for the light emitter 54. Further reference numeral 51 in FIG. 1 denotes a lock member for locking the camera back 9.

As shown in FIG. 2, the gear train 13 comprises a transmission shaft 60 which extends below the real image viewfinder 35 of the viewfinder unit 7 in the transverse direction. A first gear train 13a which is connected to the reduction gearing 11 is provided on the magazine chamber side of the transmission shaft 60 and a second gear train 13b which is connected to the rewind spindle 12 is provided on the take-up chamber side of the same.

The first gear train 13a comprises a first feed gear 61 in the form of a bevel gear fixed to the end of the transmission shaft 60, a second feed gear 62 having a lower portion in the form of a bevel gear in mesh with the first feed gear 61 and an upper portion in the form of a spur gear, and a third feed gear 63 in the form of a spur gear in mesh with the upper portion of the second feed gear 62.

The second gear train 13b comprises a fourth feed gear 64 in the form of a bevel gear fixed to the end of the transmission shaft 60, a fifth feed gear 65 having a lower portion in the form of a bevel gear in mesh with the fourth feed gear 64 and an upper portion in the form of a spur gear, a sixth feed gear 66 having an upper portion in the form of a larger diameter spur gear in mesh with the fifth feed gear 65 and a lower portion in the form of a smaller diameter spur gear, a seventh feed gear 67 in the form of a this spur gear in mesh with the lower portion of the sixth feed gear 66 and an eighth feed gear 68 which is formed on the upper end of the rewind spindle 12 and is in mesh with the seventh feed gear 67.

The first feed gear 61 is disposed between the lens driving mechanism 21 and a bearing portion 70 (as a supporting portion) which projects upward from the upper surface of the stationary lens barrel 18 of the lens barrel unit 3 with one end portion of the transmission shaft 60 supported for rotation on the bearing portion 70. The second feed gear 62 has a central opening and is fitted on a pin-like first boss portion 71 (as a supporting portion) which projects upward from the upper surface of the lens driving mechanism 21 of the stationary lens barrel 18 on an inner side portion thereof. The third feed gear 63 has a central opening and is fitted on a pin-like second boss portion 72 (as a supporting portion) which projects upward from the upper surface of the lens driving mechanism 21 of the stationary lens barrel 18 on an outer side portion thereof. The second and third feed gears 62 and 63 are held there by a retainer plate 53 provided on the upper surfaces thereof.

The other end portion of the transmission gear 60 is supported for rotation by a bearing portion 73 formed on the upper surface of the date recording light emitter 54 fixed to the camera body 2 and the fourth feed gear 64 is accommodated in a recess beside the bearing portion 73. A pin-like third boss portion 74 projects upward from the upper surface of the light emitter 54 on the side near the magazine chamber cover 2c, and the fifth feed gear 65 having a central opening is fitted on the third boss portion 74. The sixth and seventh feed gears 66 and 67 have central openings and are fitted respectively on pin-like fourth and fifth boss portions projecting upward from the upper surface of the magazine chamber cover 2c. The fifth to eighth feed gears 65 to 68 are held there by a retainer plate 52 provided on the upper surfaces thereof.

In the camera with the arrangement described above, the roll in the film magazine loaded in the magazine chamber P is drawn out the magazine and taken up around the spool 10 in the take-up chamber S. When the film is taken up, the driving force of the film feed motor 14 is transmitted to the spool 10 by way of the reduction gearing 11. When the film is rewound, the driving force of the feed motor 14 is transmitted to the rewind spindle 12 by way of the gear train 13.

Since the feed gears 61 to 68 of the gear train are supported on supporting portions, the bearing portions 70, 73, boss portions 71, 72 and 74 to 76, formed on other parts such as stationary lens barrel 18, the light emitter 54 and the magazine chamber cover 2c, the part-to-part distances can be smaller as compared with when a supporting wall for supporting the feed gears 61 to 68 is additionally formed on the camera body 2, where a compact camera very small in outer dimensions can be obtained.

What is claimed is:

1. An improved photographic camera having a body that includes a magazine chamber in which a film magazine is loaded, and a film take-up chamber, said camera further including a stationary lens barrel attached to and projecting outwardly from said body which supports a taking lens system and is disposed between the magazine chamber and the film take-up chamber of the camera body, a film feed mechanism comprising a film take-up spool which is disposed in the film take-up chamber and is provided therein with a film feed motor, a film rewind spindle disposed in the magazine chamber to be drivingly engaged with the film spool of the film magazine loaded in the magazine chamber and a gear train for transmitting the driving force of the film feed motor to the film rewind spindle, wherein the improvement comprises that a part of the feed gears in the gear train is supported on a supporting portion formed on an exterior surface of said stationary lens barrel.

2. A film feed mechanism as defined in claim 1 in which the supporting portion is in the form of a boss portion projecting upward from a flat upper surface of the stationary lens barrel and a feed gear which rotates in a plan parallel to the upper surface of the camera body is fitted on the boss portion.

3. A film feed mechanism as defined in claim 1 in which the supporting portion is in the form of a bearing portion which projects upward from a flat upper surface of the stationary lens barrel and supports a feed gear fixed to an end of a transmission shaft extending parallel to the upper surface of the camera body.

* * * * *